United States Patent [19]

Logsdon

[11] 4,215,724
[45] Aug. 5, 1980

[54] BACKFLOW PREVENTER FOR SEWER SYSTEM

[75] Inventor: Duane D. Logsdon, Fullerton, Calif.

[73] Assignee: The Logsdon Foundation, Stanton, Calif.

[21] Appl. No.: 887,828

[22] Filed: Mar. 17, 1978

[51] Int. Cl.² ............................................. F16K 15/14
[52] U.S. Cl. ................................................... 137/852
[58] Field of Search .................. 137/852, 859; 220/209

[56] References Cited

U.S. PATENT DOCUMENTS

| 2,585,863 | 2/1952 | Smith | 137/859 |
|---|---|---|---|
| 3,105,507 | 10/1963 | Dunmire | 137/859 X |
| 3,465,786 | 9/1969 | Spisak | 137/859 X |
| 3,508,576 | 4/1970 | Gross | 137/859 X |

FOREIGN PATENT DOCUMENTS

| 146954 | 4/1936 | Austria | 137/859 |
|---|---|---|---|
| 759110 | 9/1953 | Fed. Rep. of Germany | 137/859 |
| 266913 | 8/1929 | Italy | 137/859 |

Primary Examiner—Robert G. Nilson
Attorney, Agent, or Firm—Edward D. O'Brian; K. H. Boswell

[57] ABSTRACT

A sewer backflow preventer is adapted to fit on the top of a sewer cleanout pipe. The sewer backflow preventer has an upstanding pipe which attaches to the upper most end of the sewer cleanout pipe. Projecting radially from the top of the upstanding pipe are a series of rigid spokes which terminate at and attach to a ring. A cap having an impervious side wall and a top integrally formed with the side wall is attached to the ring near the bottom of the cap. Within the interior of the cap and attached between the ring and the bottom of the cap are a series of flexible rubber straps which radiate inwardly toward the center of the cap. Integrally formed with and attached at the ends of the straps is a half sphere. The convex surface of the sphere faces downward and mates with and reversibly seals the opening of the upstanding pipe. When sewage is backed up in the sewer, the half sphere lifts off the top of the upstanding pipe and allows the sewage to discharge to the ambient environment.

10 Claims, 3 Drawing Figures

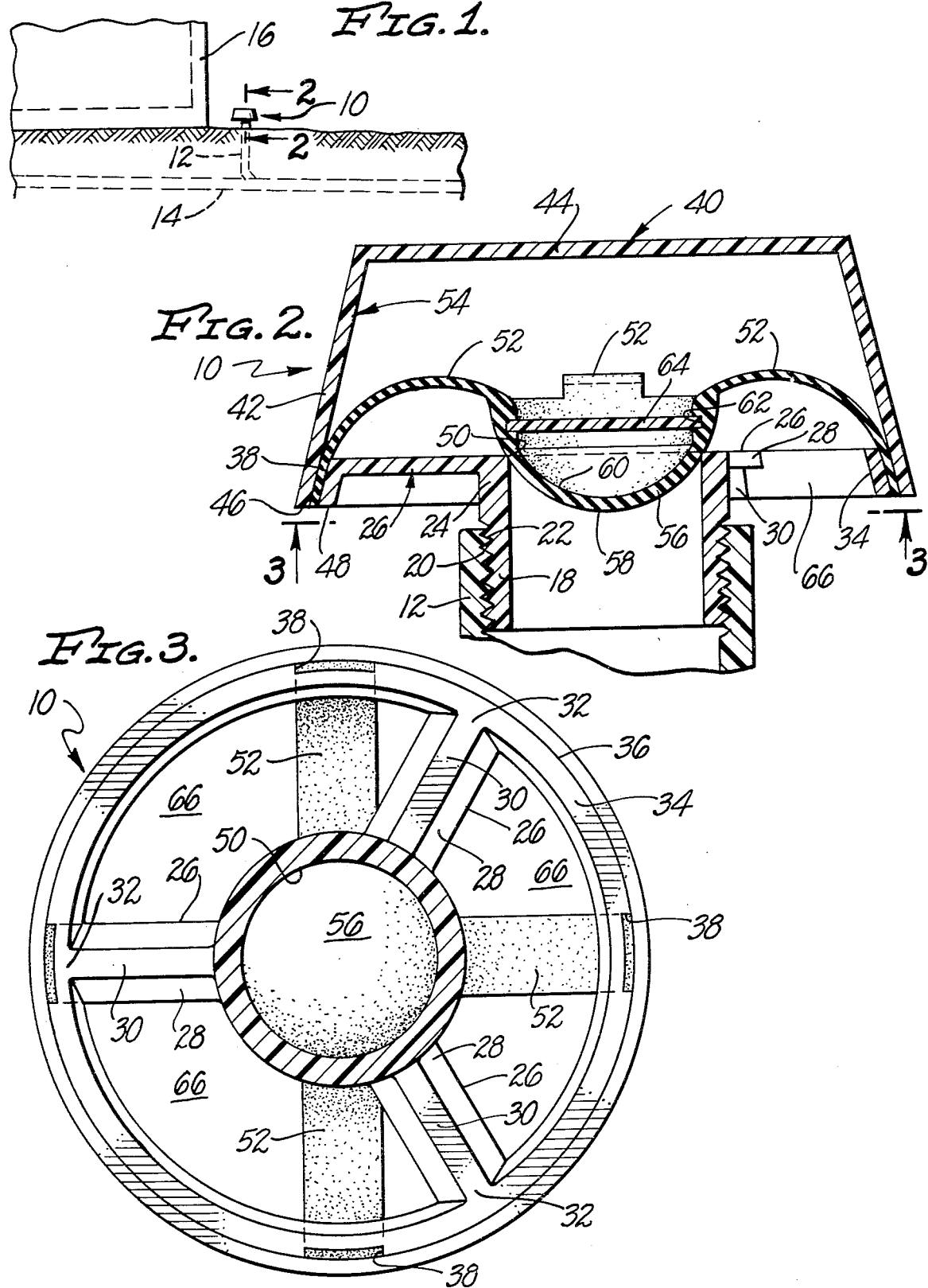
U.S. Patent   Aug. 5, 1980   4,215,724

BACKFLOW PREVENTER FOR SEWER SYSTEM

BACKGROUND OF THE INVENTION

This invention pertains to a sewer backflow prevention device which attaches to a sewer line via a sewer cleanout and allows for the discharge of backed up sewage should the sewer line become clogged.

In a building or other structure serviced via an underground sewer line, it sometimes occurs that the main sewer line or the branch line leading from the building to the main sewer line becomes clogged. This can be caused by many factors including broken or misaligned pipes. Such broken or misaligned pipes present projections, ridges or sharp bends on which bulk material hangs up and causes a nucleus for clogging. Other times roots from surface plants invade the pipes in search of moisture which may be leaking from poorly formed joints in the pipes and these roots also can form the nucleus of a clog in the pipe. Whatever the cause of the clog, the effect is that sewage becomes backed up in the line and eventually the backflow will overflow from the fixtures and drains in the building.

Modern sewer systems are equipped with clean out pipes or outlets. The cleanout is accomplished by inserting a Tee or Y-joint in the sewer line just outside the building. Leading from the Tee or Y-joint is a vertical or near vertical cleanout pipe which is capped or plugged near the ground surface. While this type of cleanout allows for access to the sewer line for removing a clog, it does not prevent the backflow of sewage through the sewer line which will eventually overflow from the fixtures or drain inside of the building.

BRIEF DESCRIPTION OF THE INVENTION

In view of the previous discussion it is considered that there exists a need for a sewer backflow prevention device. It is therefore a broad object of this invention to fulfill this need for a sewer backflow prevention device. It is an additional object to provide a device that is both economical in use and easy to manufacture. Another object of the invention is to provide a backflow prevention device which allows for sewage backflow to be discharged but when the sewer line is normally free and open the backflow prevention device is automatically closed preventing the introduction of outside water, soil or vermin into the sewer line.

In accordance with this invention these and other objects, features and attendant advantages of the present invention are achieved by providing a sewer backflow prevention device adapted to fit on the top of a sewer cleanout pipe. The sewer backflow prevention device has an upstanding pipe which is attached to the sewer cleanout pipe. Radiating outwardly from the top of the upstanding pipe are a series of rigid support spokes. The ends of these spokes are integrally formed with and attached to a ring. A cap having an impervious continuous side wall and a top integrally formed with the side wall is attached to the ring near the bottom of the cap. Inbetween the support spokes are open spaces allowing access into and out of the interior of the cap. Within the interior of the cap and attached between the ring and the cap are a series of flexible straps which radiate inwardly from their point of attachment toward the center of the cap where they are integrally formed with and attached to a half sphere. The half sphere has its outside convex surface facing in a downwardly direction and this convex surface mates with and reversibly seals the opening in the top of the upstanding pipe.

BRIEF DESCRIPTION OF THE DRAWINGS

The invention will be most fully understood and described when taken in conjunction with the accompanying drawings in which:

FIG. 1 is a cross section of a building, the ground on which it stands, and a sewer system, including a cleanout pipe servicing said building. Connected to the cleanout pipe is a backflow prevention device of the invention;

FIG. 2 is a side elevation in cross section of the backflow prevention device taken at line 2—2 of FIG. 1;

FIG. 3 is a bottom view in partial section of the backflow prevention device taken at line 3—3 of FIG. 2.

The sewer backflow prevention device illustrated in the drawing and described in the remainder of this specification utilizes certain essentially intangible concepts of the invention as set forth and defined in the appended claims. It will be realized that these concepts can be utilized with a variety of somewhat differently appearing and differently constructed sewer backflow prevention devices through the use of routine design and engineering skill without departing form the spirit and scope of the invention.

DETAILED DESCRIPTION

In the drawings there is shown a sewage backflow prevention device 10 which attaches to a sewer cleanout pipe 12 which in turn is attached to a sewer line 14 servicing a building 16.

The backflow prevention device 10 has an upstanding pipe 18 having external screw threads 20 around its lowermost portion which mate with internal screw threads 22 around the top of the interior of cleanout pipe 12. Extending radially outward from the top portion 24 of pipe 18 are three rigid spokes collectively identified by the numeral 26. Spokes 26 are integrally formed with pipe 18 and extend generally perpendicular to the longitudinal axis of pipe 18. When viewed in cross section, spokes 26 are of a generally Tee configuration having a flat cross piece 28 with a rib 30 perpendicular to cross piece 28. This construction renders spokes 26 very rigid. The ends 32 of spokes 26 not attached to pipe 18 are attached to and integrally formed with ring 34. As noted, ring 34, spokes 26 and upstanding pipe 18 are all integrally formed and molded to consist of ring 34 being co-axial with upstanding pipe 18 and rigidly attached thereto by spokes 26.

The outside surface 36 of ring 34 is inclined slightly in respect to the longitudinal axis of upstanding pipe 18 such that the outside diameter of ring 34 is greater at the bottom of the ring than at the top of the ring.

In the outside surface 36 of ring 34 are four grooves collectively identified by numeral 38, the function of which will be subsequently described. Grooves 38 are symmetrically positioned 90 degrees apart around the circumference of ring 34.

A cap 40 has a continuous side wall 42 and a top 44 integrally formed with the side wall. Cap 40 is of a generally frustrum-like shape. The inside diameter at bottom edge 46 of cup 40 is the same as the outside diameter of ring 34 at its bottom edge 48 and the side wall 42 is inclined at the same angle in respect to an imaginary line perpendicular to top 44 as is the outside surface 36 of ring 34 to the longitudinal axis of upstanding pipe 18. This allows the lower most portion of cap 40 to fit over ring 34 until bottom edge 48 of cap 40 fits flush with bottom edge 48 of ring 34 at which time cap 40 will be held fast to ring 34 by the frictional forces between the surfaces of the cap and the ring. When so positioned, cap 40 is maintained over the top opening 50 of upstanding pipe 18.

As shown in FIGS. 2 and 3, within the interior of cap 40 are four flexible rubber straps collectively identified by numeral 52. Straps 52 are of the same cross sectional shape as are grooves 38; however, they are of a slightly larger dimension. Since straps 52 are formed of a flexible rubber material, they can be compressed into grooves 38. When cap 40 is fitted to ring 34, straps 52 are firmly fixed between grooves 38 and the inside wall 54 of cap 40.

Flexible straps 52 extend inwardly from their point of attachment in grooves 38, toward the center of the interior of cap 40 at which point they attach to and are integrally formed with a half sphere 56. The convex surface 58 of half sphere 56 faces in a generally downward direction and mates with and seals opening 50 of pipe 18 from the ambient environment. Within the interior concave surface 60 of half sphere 56 is an annular groove 62. A disk 64 fits into annular groove 62 and maintains the spherical shape of half sphere 56. Half sphere 56 and flexible straps 52 are constructed of a flexible material which allows half sphere 56 to move within the interior of cap 40 and acts as a checkvalve against the opening 50 of pipe 18.

Should sewer line 14 become stopped and sewage back up in the line 14, the sewage will flow through cleanout pipe 12 and the pressure of the sewage will cause half sphere 56 to lift up from the top opening 50 of pipe 18 and allow the backed up sewage to flow through the top opening 40 of pipe 18 and out of the backflow prevention device through spaces 66 between spokes 26. When the sewage backflow is halted half sphere 56 under the influence of gravity moves down and seals against top opening 50 of pipe 18. This prevents outside water, soil or vermin from gaining access to the sewer line 14.

Upstanding pipe 18 and cap 30 are generally constructed of ABS polymer or other plastic which is suitable for local plumbing codes. In addition to the frictional fit between the cap 40, ring 34 and rubber straps 52, these parts can be glued together by appropriate solvents or cements useful for the polymer, plastic and rubber.

I claim:

1. A sewer line backflow preventer attaching to a sewer clean out pipe which comprises:
an upstanding pipe having an upper end and a lower end;
attaching means for attaching said pipe means to said sewer line;
cap means;
rigid support means for attaching said cap means to said pipe means;
said rigid support means comprises a rigid support integrally formed with and radially projecting outwardly from the upper end of said pipe, said rigid support having at least one perforation wherein both air and sewage can pass through said rigid support;
said rigid support comprising a plurality of elongated spokes, said spokes integrally formed with and radially projecting outwardly from the upper end of said pipe;
sealing means;
flexible support means for flexibly attaching said sealing means to said rigid support means such that said sealing means is freely suspended within said cap means and under the influence of gravity fits against and seals said pipe means from the ambient environment and under the influence of fluid pressure within said pipe is lifted against gravity, opening said pipe means to allow egress of said fluid from said pipe means.

2. The backflow preventer of claim 1 wherein:
said flexible support means comprises a plurality of flexible straps integrally attached to said sealing means.

3. The backflow preventer of claim 2 wherein:
said sealing means comprises a half sphere means, said half sphere means having a convex surface, said convex surface reversibly sealing said pipe means from the ambient environment.

4. A sewer line backflow preventer attaching to a sewer clean out pipe which comprises:
pipe means;
attaching means for attaching said pipe means to said sewer line;
cap means;
rigid support means for attaching said cap means to said pipe means;
sealing means;
flexible support means for flexibly attaching said sealing means to said rigid support means such that said sealing means reversibly fits against and reversibly seals said pipe means from the ambient environment,
said cap means comprises an upstanding hollow, frustrum-shaped cap, said cap having a top and a continuous side wall, said top integrally formed with said continuous side wall, said cap having an open bottom.

5. The backflow preventer of claim 4 wherein:
said pipe means comprises an upstanding pipe having an upper end and a lower end.

6. The backflow preventer of claim 5 wherein:
said rigid support means comprises a rigid support integrally formed with and radially projecting outwardly from the upper end of said pipe, said rigid support having at least one perforation wherein both air and sewage can pass through said rigid support.

7. The backflow preventer of claim 6 wherein:
said rigid support comprises a plurality of elongated spokes, said spokes integrally formed with and radially projecting outwardly from the upper end of said pipe.

8. A sewer line backflow preventer attaching to a sewer clean out pipe which comprises:
pipe means;
attaching means for attaching said pipe means to said sewer line;
cap means;
rigid support means for attaching said cap means to said pipe means;
sealing means;
flexible support means for flexibly attaching said sealing means to said rigid support means such that said sealing means reversibly fits against and reversibly seals said pipe means from the ambient environment;

said pipe means comprises an upstanding pipe having an upper end and a lower end;

said rigid support means comprises a plurality of spokes, said spokes integrally attached to and radially projecting outward from the upper end of said upstanding pipe, said spokes having a terminal end distal to said attachment to said upstanding pipe;

ring means, said ring means integrally attached to said terminal end of said spoke means;

said cap means comprising an upstanding hollow frustrum-shaped cap, said cap having a top and a continuous side wall, said top integrally formed with said continuous side wall, said cap having an open bottom;

said cap attaching to said ring means proximal to said bottom of said cap.

9. A sewer line backflow preventer attaching to a sewer clean out pipe which comprises:

pipe means;

attaching means for attaching said pipe means to said sewer line;

cap means;

rigid support means for attaching said cap means to said pipe means;

sealing means;

flexible support means for flexibly attaching said sealing means to said rigid support means such that said sealing means reversibly fits against and reversibly seals said pipe means from the ambient environment;

said flexible support means comprises a plurality of flexible straps integrally attached to said sealing means;

said sealing means comprises a half sphere means, said half sphere means having a convex surface, said convex surface reversibly sealing said pipe means from the ambient environment;

said half sphere means comprises a half sphere;

said half sphere being formed of a rubber material;

said half sphere having a convex and a concave surface;

said concave surface having an annular groove;

disk means, said disk means fitting into said annular groove;

said convex surface reversibly fitting against and sealing said pipe means from the ambient environment.

10. A sewer line backflow preventer attaching to a sewer clean pipe which comprises:

pipe means, said pipe means comprising an upstanding pipe having an upper end and a lower end;

attaching means for attaching said pipe means to said sewer line, said attaching means including said upstanding pipe having screw threads proximal to the lower end of said pipe, said screw threads mating with and attaching to screw threads on said sewer pipe;

cap means, said cap means comprising an upstanding hollow, frustrum-shaped cap, said cap having a top and a continuous side wall, said top integrally formed with said continuous side wall, said cap having an open bottom;

rigid support means, said rigid support means comprising a plurality of spokes, said spokes integrally attached to and radially projecting outward from the upper end of said upstanding pipe, said spokes having a terminal end distal to said attachment to said upstanding pipe, a ring, said ring integrally attaching to said terminal end of said spokes, said cap attaching to said ring proximal to said bottom of said cap;

sealing means, said sealing means comprising a half sphere, said half sphere being formed of a rubber material, said half sphere having a convex and a concave surface, said concave surface having an annular groove, a disk, said disk fitting into said annular groove, said convex surface reversibly fitting against and sealing said upstanding pipe from the ambient environment;

flexible support means for attaching said sealing means to said rigid support means, said flexible support means comprising a plurality of flexible straps integrally attached to and radiating outwardly from said half sphere, said flexible straps attaching to said ring.

* * * * *